(12) United States Patent
Fu

(10) Patent No.: US 7,029,144 B2
(45) Date of Patent: Apr. 18, 2006

(54) MULTI-PURPOSE LIGHTING FIXTURE

(76) Inventor: San Yang Fu, PMB#1008, 1867 Ygnacio Valley Rd., Walnut Creek, CA (US) 94598

( * ) Notice: Subject to any disclaimer, the term of this patent is extended or adjusted under 35 U.S.C. 154(b) by 105 days.

(21) Appl. No.: 10/870,031

(22) Filed: Jun. 18, 2004

(65) Prior Publication Data

US 2005/0281031 A1    Dec. 22, 2005

(51) Int. Cl.
  *F21L 9/00* (2006.01)
(52) U.S. Cl. .................. 362/183; 362/240
(58) Field of Classification Search ............ 362/183, 362/153, 152, 240
See application file for complete search history.

(56) References Cited

U.S. PATENT DOCUMENTS 5,237,490 A * 8/1993 Ferng .................. 362/183
5,453,729 A * 9/1995 Chu .................... 340/332
6,013,985 A * 1/2000 Green et al. ............ 315/149
2003/0137831 A1 * 7/2003 Lin ..................... 362/183

* cited by examiner

*Primary Examiner*—Thomas M. Sember
*Assistant Examiner*—James W Cranson, Jr.
(74) *Attorney, Agent, or Firm*—Leong C. Lei

(57) ABSTRACT

A multi-purpose lighting fixture comprised of a see-through light shade, a solar energy collection ring, a holder, a circuit board, a rechargeable battery and a base cover; the ring being disposed at a circular ascend being disposed at the center of the holder, one or multiple solar cell being provided on the surface of the ring and fixed to the ascend; a through hole on the ring allowing lead-out wires to connect to the circuit board below the ring; LED being provided at the center of the circuit board and connected to a power source through the circuit board and the rechargeable battery disposed below the circuit board; the shade provided over the ring and the holder with the circuit board below the holder being upward stuffed into the shade and secured with screws; the space below the circuit board being sealed up with the base cover to give streamlined appearance for the lighting fixture.

6 Claims, 7 Drawing Sheets

US 7,029,144 B2

MULTI-PURPOSE LIGHTING FIXTURE

BACKGROUND OF THE INVENTION (a) Technical Field of the Invention

The present invention is related to a multi-purpose lighting fixture, and more particularly to one having provided on its surface a solar cell to charge a built-in rechargeable battery to supply power to light an LED or LEDs disposed at the center of a circuit board.

(b) Description of the Prior Art

As illustrated in FIG. 1 of the accompanying drawings, a landscape lighting unit erected on a conventional roadside has reduced its reflection for maintaining driving safety; when used for road lighting, the primary purpose is to make sure of a clear visual sight for the drivers or pedestrians to control road and traffic conditions to maintain safe traffic and facilitate traffic flow during night hours or where lighting is undergoing drastic change of its brightness; and when erected in community park and activities, the lighting unit can be designed in special style to promote the happy and pleasant atmosphere of events held during night hours on the park while providing space for activities, recreation and emergency evacuation. However, in any application described above, the lighting unit of the prior art 1 for being provided in large quantity consumes comparatively higher power. Given the lighting unit erected in a community park, the primary purpose is for creating certain amicable atmosphere in terms of the projection direction, higher temperature of heat source is emitted from the lighting unit and the lighting unit is also vulnerable to be damaged. Long-term power consumption by those lighting units would cause a serious problem to the limited energy source available in the world.

SUMMARY OF THE INVENTION

The primary purpose of the present invention is to provide a multi-lighting fixture that maintains the conventional advantages but at a much lower consumption of energy and expenditures. To achieve the purpose, multiple solar cells are disposed on the lighting fixture to supply the power needed by the lighting fixture.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
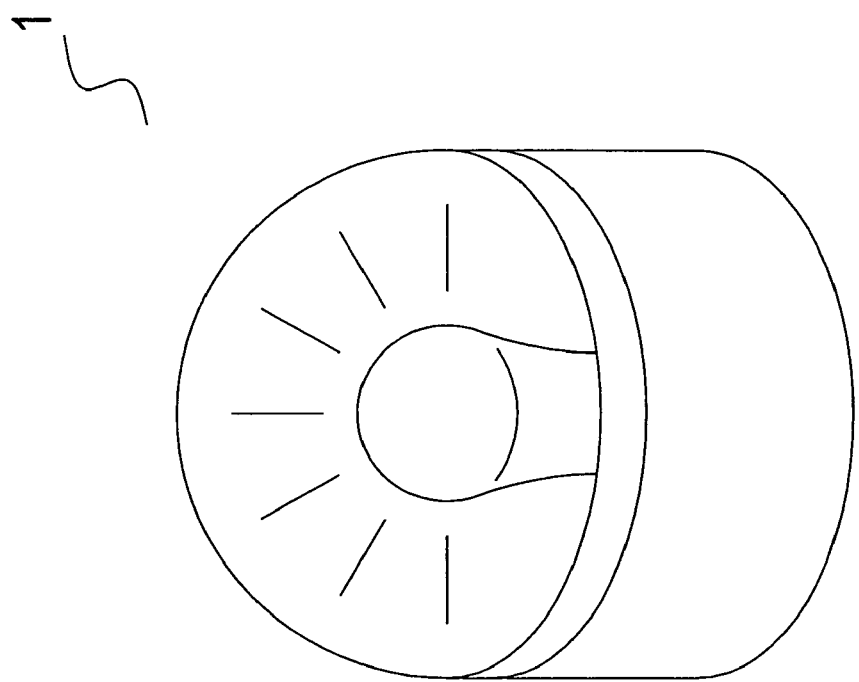
FIG. 1 is a view of a multi-purpose lighting fixture of the prior art.
Figure 2:
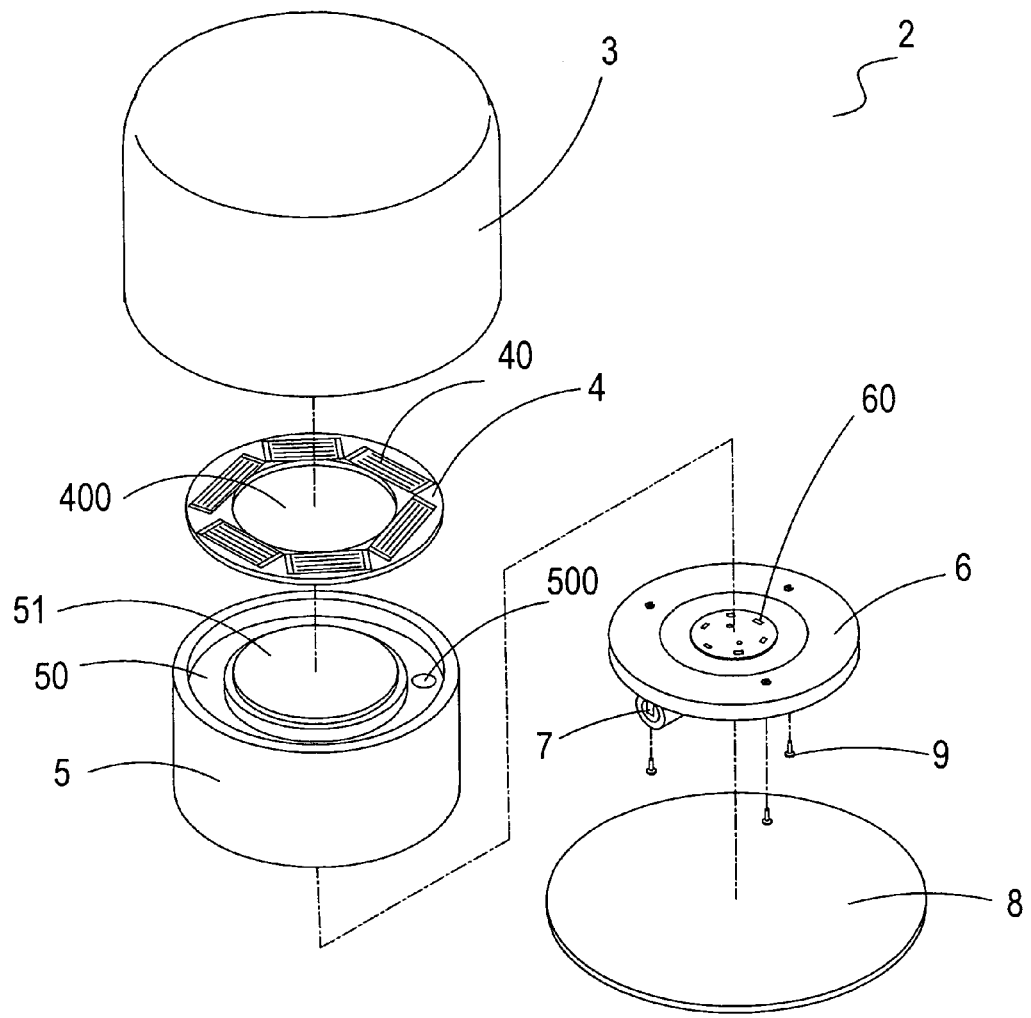
FIG. 2 is an exploded view of a preferred embodiment of the present invention.
Figure 3:
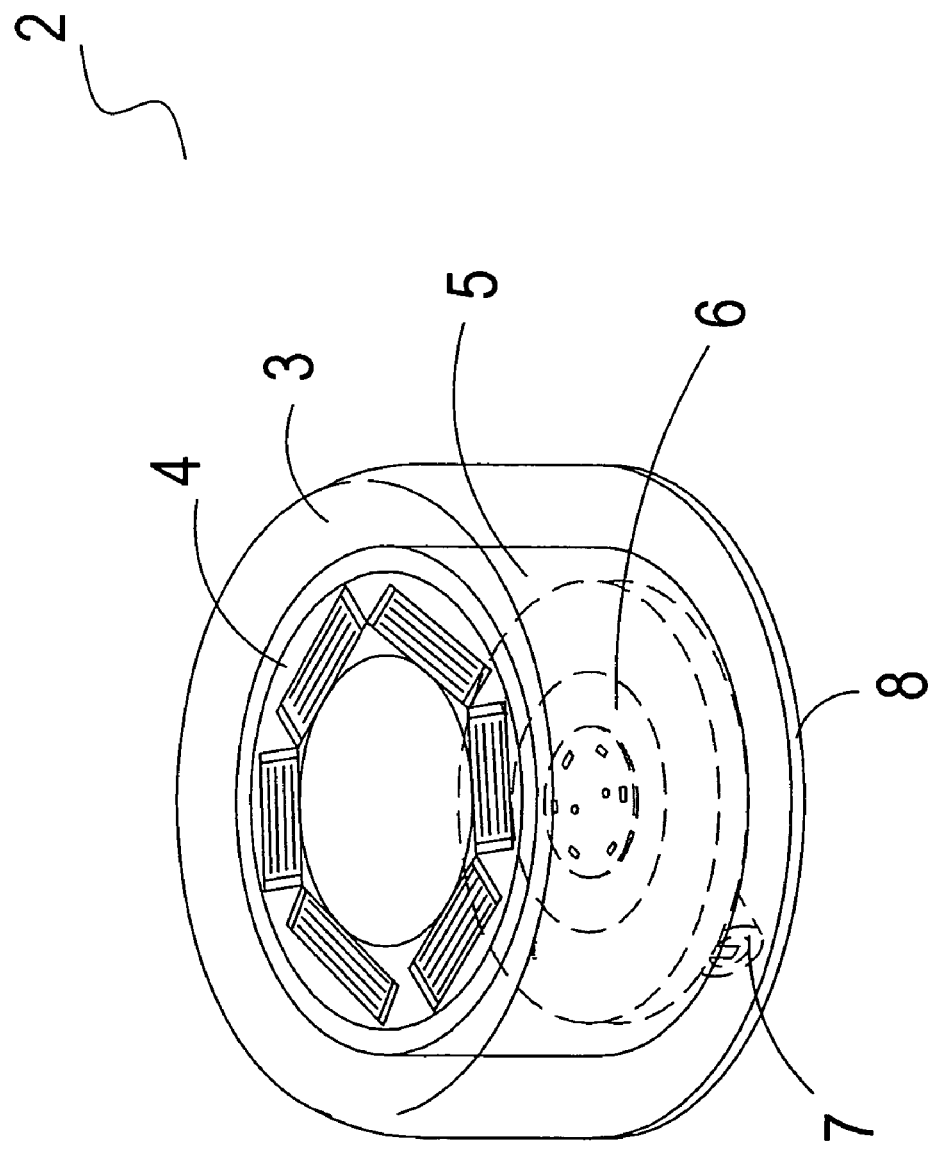
FIG. 3 is a perspective view of the preferred embodiment of the present invention as assembled.
Figure 4:
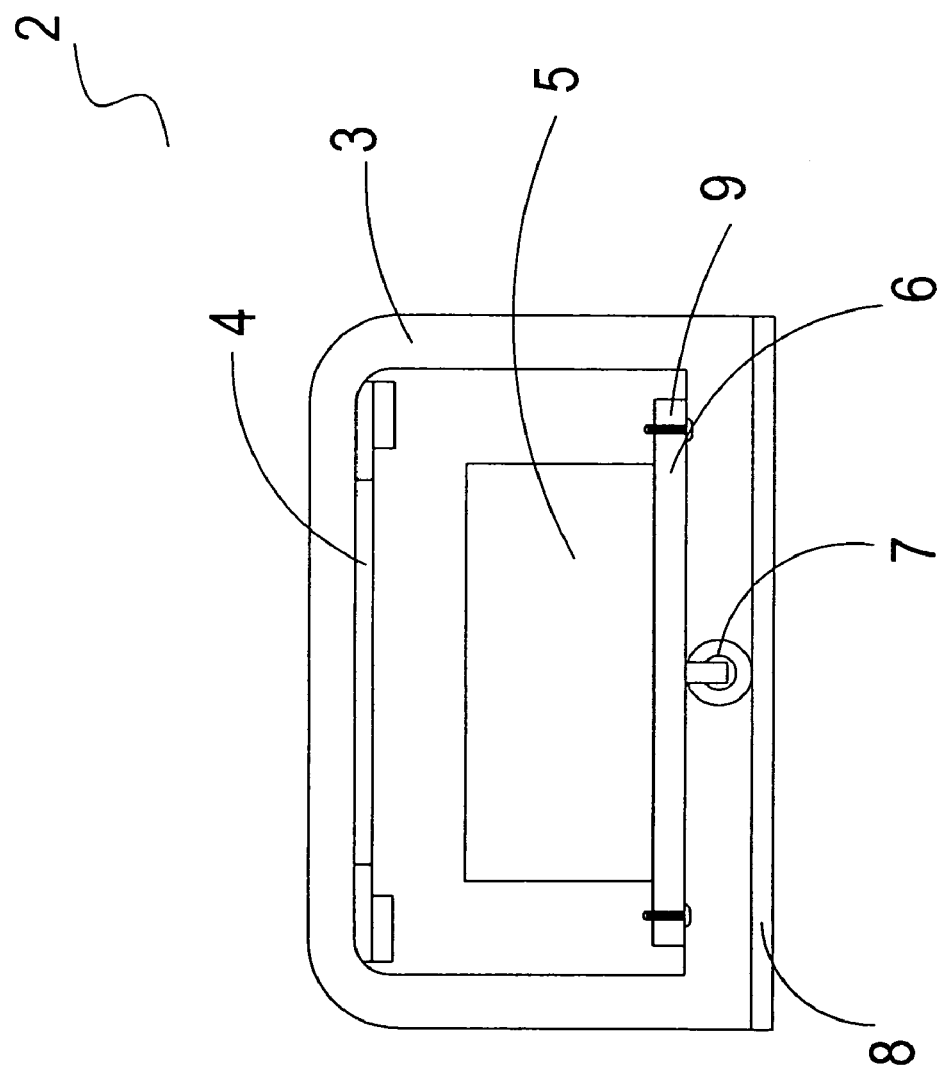
FIG. 4 is a side view of the preferred embodiment of the present invention.

Referring to FIGS. 2, 3, and 4, a preferred embodiment of a multi-purpose lighting fixture is comprised of a main unit 2 including a see-through shade 3, a solar energy collection ring 4, a holder 5, a circuit board 6, a rechargeable battery 7, and a base cover 8. The holder 5 provided inside the main unit 2 is disposed at its upper inner circumference a circular channel 50 to define an ascend 51 protruding from the center of the holder 5 and the ring 4 disposed with multiple solar cells 40 abutted to one another at one of their corners is provided on the ascend 51. A central opening 400 disposed at the center of the ring is provided to merely rest and be fixed onto the ascend 51. A through hole 500 provided in the circular channel 50 allows the lead-out wire extending from the ring 4 to connect the circuit board located below the circular channel 50. One LED 60 is or multiple LEDs 60 are distributed at center of the circuit board 6 and is connected to a power supply through the circuit board 6 and the rechargeable battery 7 located below the circuit board 6. The shade 3 related to a hollow cylinder made of glass opened at bottom and closed at top to allow complete transparency for the light to pass through is inserted at where above the ring 4 and the holder 5. The circuit board 6 is upwardly stuffed into the shade 3 at where below the holder 5 and is secured with multiple screws 9 to the holder 5. The circuit board 6 is sealed at its bottom with the base cover 8 to give a flushed and streamline style for the light fixture.

Figure 5:
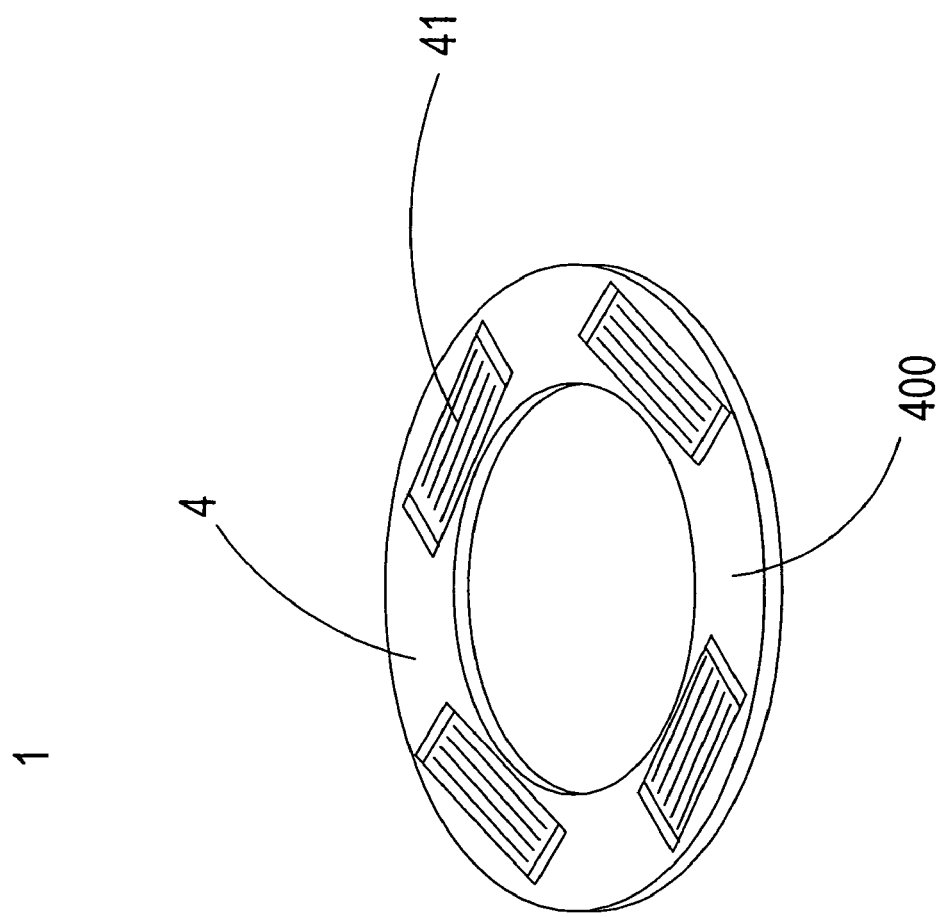
FIG. 5 is a perspective view of multiple solar cells of the preferred embodiment of the present invention.

As illustrated in FIG. 5, one solar cell 41 or multiple solar cells are distributed on the surface of the ring 4 at a certain spacing between any two abutted solar cells 41 so that the opening 400 is merely inserted and secured onto the ascend 51 protruding from the center of the holder 51.

Figure 6:
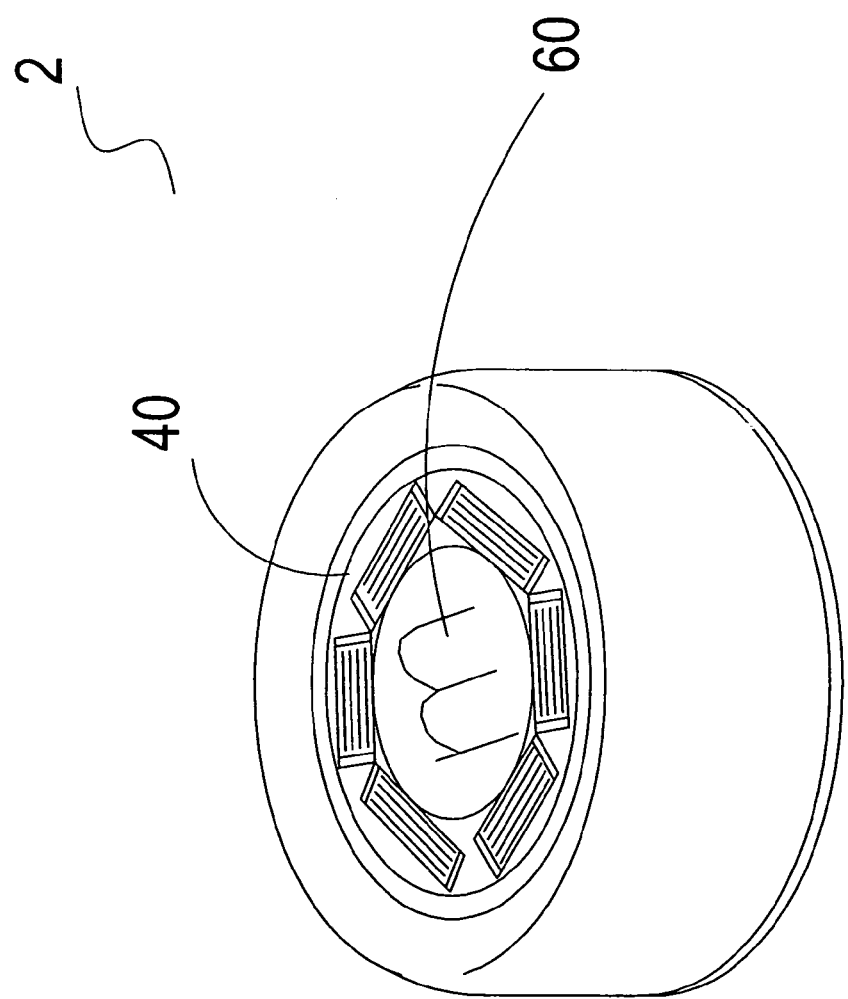
FIG. 6 is schematic view showing that the light of the preferred embodiment of the present invention is emitting light.

Those rings 4 distributed with multiple solar cells 40 as illustrated in FIG. 6 absorbs solar energy to charge the rechargeable battery 7, and the rechargeable battery 7 in turn supplies power to the or those LEDs 60 provided at the center of the circuit board 6. When the LED at the center 60 is made into a shape of the letter "m" or any other design, it permits the illuminated "m" or other variations as desired depending on the owner of the advertisement.

Figure 7:
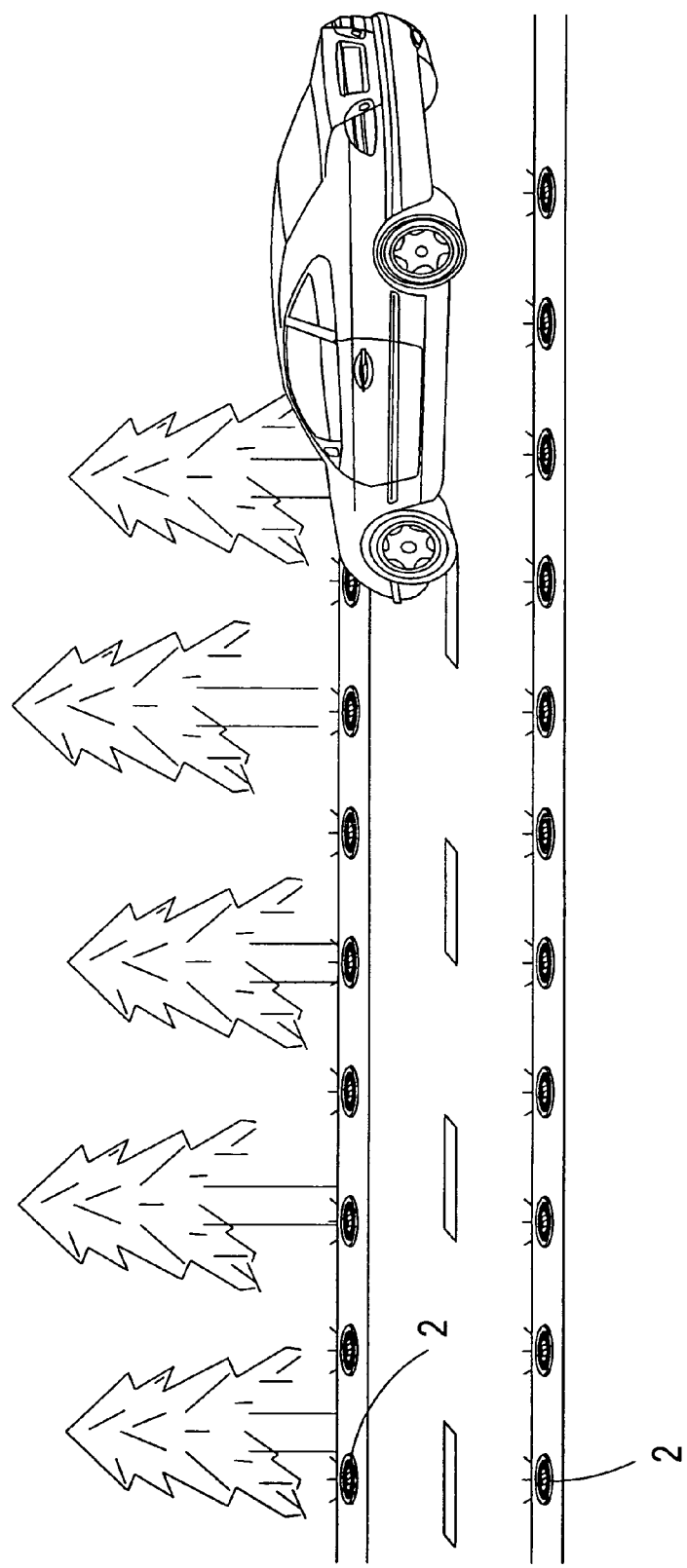
FIG. 7 is a schematic view showing the application of the preferred embodiment of the present invention on both sides of a road.

Now referring to FIG. 7, multiple main units 2 of the present invention are buried flushed with the surface on both sides of a road to light the road during night hours with the power saved during the daytime by those LEDs 60 when the drivers or the pedestrians are approaching or passing through a tunnel or any place with drastic changes in the lighting to have clear vision and solid control of road condition for multiple purpose including maintaining traffic safety, facilitated traffic flow and landscape lighting.

To highlight the advanced and practical applications of the present invention, a comparison is made below between the prior art and the present invention:

Flaws of the prior art include the requirement for it to be provided in larger quantities, thus consumes much more power and will eventually help dry out the power resources; that it generates higher heat thus to be vulnerable to be damaged; that it requires higher energy costs; that it is monotonous and prevents from variations; and that it is more difficult in the erection. On the contrary, the prevent invention offers advantages including that it serves as a guide; that it has the minimum failure, longer service life and effectively reduced heat; that it allows lighting during night hours relying solely upon solar energy; that it while maintaining safe traffic and flow serves as landscape lighting; and that it my emit various types of patterns or letters to promote indication and advertisement results.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A multi-purpose lighting fixture is comprised of a see-through light shade, a ring to collect solar energy, a holder, a circuit board, a rechargeable battery and a base cover; the holder being provided in the lighting fixture, a circular channel being recessed on the upper inner circumference of the holder, an ascend being protruded from the center of the holder; the ring being disposed on the ascend; one or multiple solar cells being provided close to one another at one of their corners; an opening being provided at the center of the ring for the ring to merely rest and be secured onto the ascend; a through hole being provided in the ring to allow a lead-out wire extending from the ring to be connected to the circuit board located at where below the ring; one or more light emission diodes being distributed on the center of the circuit board and connected to a power supply; the light shade being disposed over the ring and the holder; the circuit board below the holder being upwardly stuffed into the shade; the circuit board being fastened with multiple screws; and the space below the circuit board being sealed with the base cover.

2. A multi-purpose lighting fixture as claimed in claim 1, wherein, those solar cells are distributed with a certain space between any two abutted cells for the central opening of the ring to be merely inserted and secured onto the ascend.

3. A multi-purpose lighting fixture as claimed in claim 1, wherein, the rechargeable battery supplies power to one LED is or multiple LEDs are distributed at the center of the circuit board in a letter shape or any other pattern thus to illuminate the shape or other pattern.

4. A multi-purpose lighting fixture as claimed in claim 1, wherein, those LEDs are arranged in a logo at the center of the circuit board and illuminated relying upon the power supplied by the rechargeable battery for marking and advertising purposes.

5. A multi-purpose lighting fixture as claimed in claim 1, wherein, the shade is made of glass in a hollow cylindrical body that permits complete light transmission with its top closed and its bottom opened.

6. A multi-purpose lighting fixture as claimed in claim 1, wherein, the shade is provided with its opening end facing upward and covered with a water-proof pad, a solar energy collection ring, a holder, a circuit board, and a rechargeable battery contained in a see-through shade, and a see-through cover covers up the gap for the light fixture to achieve the purpose of providing complete light emission.

* * * * *